Nov. 27, 1956  R. L. DAVIS, JR., ET AL  2,772,408
ANNUNCIATOR SYSTEM
Filed Dec. 24, 1954

Inventors:
Reuel L. Davis Jr.
Frederick W. Newman
by, Richard E. Hosley
Their Attorney

United States Patent Office 2,772,408
Patented Nov. 27, 1956

2,772,408

ANNUNCIATOR SYSTEM

Reuel L. Davis, Jr., Lynnfield Center, and Frederick W. Newman, Wenham, Mass., assignors to General Electric Company, a corporation of New York Application December 24, 1954, Serial No. 477,568

3 Claims. (Cl. 340—220)

The present invention relates to annunciators and, more particularly, to indicating systems which provide three characteristic output signals through an annunciator-type instrument which provides but two condition indications.

The small "match box" indicator for signaling "on" and "off" conditions has been utilized for many years aboard aircraft to provide simplified signaling of pressure, temperature, and other conditions. Though such devices have been principally useful as warning indicators, they have become of increased interest for use as the primary indicators where simplified panel presentations are desirable to minimize the difficulties in observer scanning of numerous complex panel instruments. The small size and weight of such annunciators are particularly attractive, as is also the clarity of visual indication which they provide. It has been found, for example, that a large number of these indicators may be arranged in a group and that a fault or "off" condition of one of them may be readily perceived. For most purposes, quantitative or pointer type indications are not absolutely essential, but the simple on-off indicator does not afford any signal of a critical, emergency, or failure condition. It should be apparent that such further indications may be of the very greatest value, particularly in the operation of an aircraft, where emergency measures may be employed to preserve safe flight when a timely warning is provided of an impending temperature, pressure, or other disturbance.

In accordance with teachings of the present invention, the conventional two-condition electrical annunciator or indicator may be employed to signal a further critical condition. The visual evidence of such critical conditions is afforded by intermittent movement of the indicating members of such annunciators, in response to electrical circuit interruptions occasioned by intermittent switches, such as those of the bimetal thermal type. Suitable arrangements include primary detection switches having an additional contact disposed to be closed when a critical condition is experienced. Simple and low cost indications of normal, inoperative, and critical conditions may thus be displayed in a most conspicous manner.

One of the objects of the present invention is to provide a simple and inexpensive annunciator system for evidencing three conditions of operation of associated apparatus.

A further object is to provide a novel and improved indicating system utilizing intermittent switching units to occasion intermittent movement of an indicator to signal the occurrence of a critical condition.

By way of a summary account of one aspect of this invention, we provide a two-condition annunciator which signals "off" and "on" conditions dependent upon the positions of a movable magnet armature actuated in response to the energizing of either of two stator coils. Each of the stator coils is coupled across an electrical power source through a separate switch. In addition, a bimetal thermal switch is in circuit with one of the stator coils and the voltage source through a third switch contact, which is actuated together with the other switch contacts by a pressure-responsive detector. The third switch is disposed to excite the thermal switch when a critical pressure condition is experienced, such as a particularly low pressure of lubricating oil in an aircraft engine. When the thermal switch is excited responsive to occurrences of a predetermined low pressure, the indicator armature is oscillated, and the observer's attention is immediately drawn to the moving indicator.

Additional objectives and features of this invention may be most readily appreciated through reference to the following description taken in connection with the accompanying drawings, wherein.

Figures 1, 2, 3:
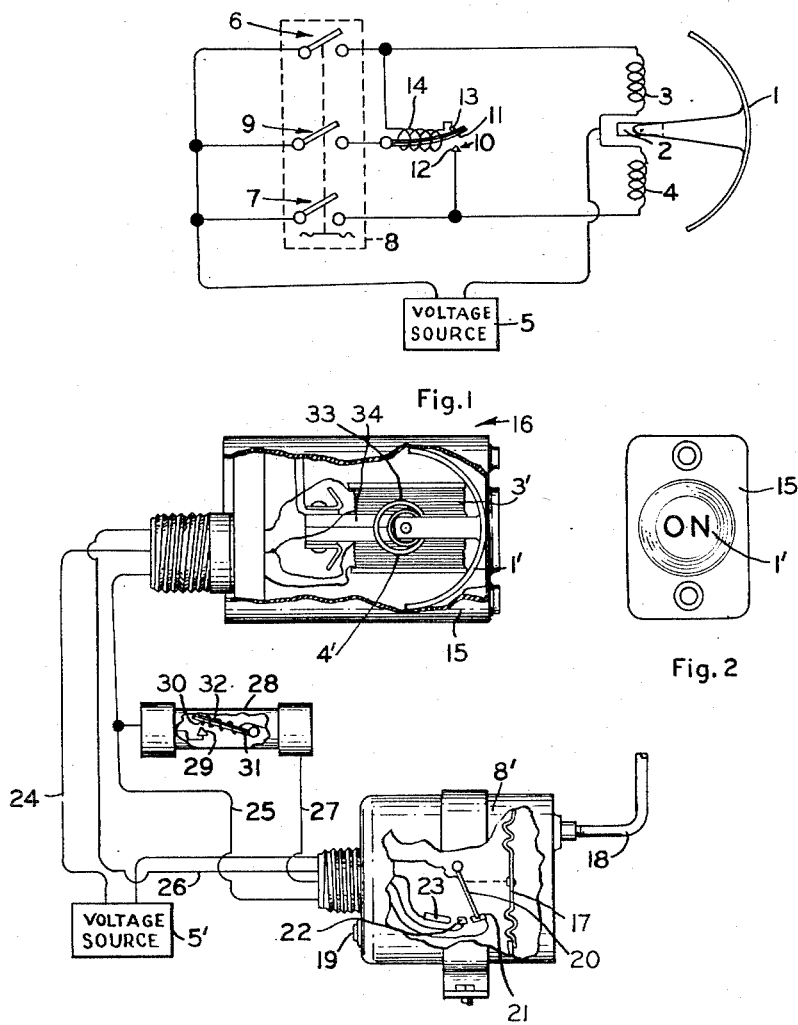
Figure 1 is a schematic diagram of one embodiment of a three-condition annunciator as taught by the present disclosures.
Figure 2 is a front pictorial view of a small annunciator which may be utilized in practicing these teachings.
Figure 3 is a partially pictorial and partially schematic system embodying our improved annunciator apparatus, wherein the annunciator element is illustrated in a side view of the same indicator pictured in Figure 2.

Referring to the diagram of Figure 1, there is illustrated a curved indicator member 1, which is angularly movable with its attached magnetized armature element 2, through a limited angular travel. The stator coils 3 and 4 are disposed proximately with the permanently magnetized armature 2, such that electrical excitation of one of these coils will occasion angular movement of armature 2 in one direction and electrical excitation of the other will produce angular movement of the armature in the opposite direction. Coils 3 and 4 are in separate parallel coupling across a voltage source 5, each through a serially connected independent switching element 6 and 7, respectively. Switching elements 6, 7 are two of the three elements of a three-condition switch outlined by the dashed lines 8, the third switching element 9 thereof being serially coupled with a bimetal thermal switch 10 and the series combination being shunted across switch element 7. In this embodiment, the bimetal interrupter 10 is shown to include a bimetal armature 11 which may be closed with contact 12, when heated, to shunt switch element 9 across switch element 7. Stator coil 4 of the indicator is then excited, if switch element 9 is closed, to move indicator 1 in one angular direction. The interrupter also includes a second contact, 13, which is connected in series with a heating coil 14. Bimetal armature 11, contact 13, and heating coil 14 are arranged to couple switch element 9 in shunting relationship with switch element 6 when the bimetal armature 11 is cooled.

The three-condition switch 8 may comprise a pressure responsive mechanism, for example, which will close switch element 7 when no pressure is experienced, whereupon stator coil 4 will become energized and deflect indicator 1 to a position at which it will signal an "off" or failure condition. Switch element 6 is disposed to be closed under normal pressure conditions, and thereby to cause excitation of stator coil 3 and angular deflection of indicator 1 to a position at which it signals an "on" or normal condition. An indication of this latter type is portrayed in Figure 2, wherein the armature 11 is viewed through a small window in the front of annunciator casing 15, the annunciator being of a construction suitable for panel mounting aboard aircraft. The third switch element, 9, is disposed within the switching mechanism 8 to respond to a condition in pressure which is critical, and which may be a low pressure, such as that likely to be experienced prior to total pressure failure. Upon closure of switch element 9, the bimetal armature 11 can first be expected to be relatively cool and in an electrically contacting relationship with contact 13, whereupon current from source 5 flows through element 9, stator coil 3, and heating coil 14. Indicator armature 2 then angularly deflects indicator 1 such that it registers an "on" condition. Within a very short interval, heating coil 14 has sufficiently heated bimetal armature 11 to cause its deflection into engagement with contact 12, at which time it is separated from contact 13. At that time, current flows through switch element 9, bimetal armature 11, and stator coil 4. Accordingly, the magnetic armature 2 is deflected in the opposite angular direction, such that the indicator 1 registers an "off" condition. This registration is brief, inasmuch as bimetal armature 11 cools quickly and deflects back into engagement with contact 13. The operation as thus far described repeats itself during the time that switch element 9 is closed, with the result that armature 11 deflects back and forth between its on and off signaling positions at a rapid rate. The fact of occurrence of a critical condition is thus made particularly conspicuous to the observer.

In Figures 2 and 3, those elements which correspond to parts discussed in connection with Figure 1 are identified by the same reference characters provided with prime accents. The compact "match box" indicator 16 in Figure 3 is actuated in response to switching within a primary detector 8', the detector being illustrated as one having a pressure responsive diaphragm 17, one side of which experiences pressures applied by way of a coupling tube 18 and the other side of which may be vented to the atmosphere by way of an opening 19. A switching arm 20 is actuated by diaphragm 17 to close with a first contact 21 when no differential pressure is sensed, to close with a second contact 22 when a predetermined critical differential pressure is experienced, and to close with a third contact 23 when normal differential pressures are sensed. Electrical leads 24 and 25 couple the stator coil 4' across the voltage source 5' when switching arm 20 engages its contact 21, whereupon the annunciator 16 will deflect its indicator 1' to signal the "off" condition. Similarly, closure of switch arm 20 with contact 23 under normal high pressure conditions will couple stator coil 3' with source 5' through leads 24 and 26, whereupon indicator 1' will deflect such that annunciator 16 reads "on." At some critical pressure lower than normal and of significance to the observer, switch arm 20 is in connection with contact 22 and couples stator coil 4' with source 5' through leads 24 and 27 and through a bimetal interrupter 28. Interrupter 28 is of a single-pole single-throw type, wherein a contact 29 is disposed to be engaged with a contact 30 carried by a bimetal strip 31 when that strip is relatively cool. A heating coil 32 is in heating proximity with strip 31 and also in series relationship with contact 30 and the internal circuitry of the interrupter. Accordingly, when switch arm 20 engages contact 22, current flows through the interrupter contacts 29 and 20, stator coil 4', and heating coil 32, such that bimetal strip 31 is heated and deflects to separate contacts 29 and 30. Almost instantly, strip 31 cools sufficiently to re-engage contacts 29 and 30 and thereby to re-excite stator coil 4'. This make-and-break action of interrupter 28 results in intermittent excitation of stator coil 4', and the permanent magnet armature of annunciator 16 oscillates between its "off" and neutral position. Return of armature 1' to a null position following excitation of one of its stator coils may be accomplished by a spiral return spring 33 coupled between the movable indicator 1' and the annunciator frame 34, or, alternatively, by a small pull-off magnet fixed in relation to the frame 34. With either the single-throw thermal interrupter of the embodiment of Figure 3 or the double-throw interrupter of Figure 1, a suitable indicator oscillation is occasioned to signal a critical condition under measurement.

The movable armatures of annunciator indicators suitable for use in our system may be of forms other than permanent magnets, and unmagnetized or electromagnetic armatures may be utilized with comparable results. Further, the annunciator stator winding means may be comprised of but a single electrical coil, it being unnecessary that dual directions of excursions of the indicator armature from a predetermined or nul position be produced. Thermal or bimetal intermittent switching devices may be replaced by circuitry or relays of other constructions which will also be conducting and non-conducting periodically when appropriately energized. It will be apparent, too, that the primary detector devices for actuating annunciators in response to conditions under measurement, such as temperature or pressure, may be set to cause indicator oscillations under critically high as well as critically low conditions, as when temperatures or pressures are excessively high. Both excessively high and low conditions may be signaled in modified systems which merely include sets of contacts positioned to be closed when either the high or low conditions are experienced, and both sets of such contacts in any system may simply be connected in parallel circuit relationship in the series circuit including them in series with the power source, indicator winding means, and intermittent switching device. Additionally, the primary detector switching contacts may be of widths permitting signaling of one condition, such as "on" or oscillating, over any predetermined range of values of measured conditions, of course.

While particular embodiments of this invention have been shown and described herein, it will occur to those skilled in the art that various changes and modifications can be accomplished without departing either in spirit or scope from the invention as set forth in the appended claims.

What we claim as new and desire to secure by Letters Patent of the United States is:

1. A condition indicator arrangement comprising a pair of electrical windings, an armature mounted for angular movement upon magnetic interaction with magnetic fields produced by said windings, an indicator coupled with said armature for limited angular movement therewith in one angular direction from a null position when one of said windings is energized and in the opposite angular direction when the other of said windings is energized, means biasing said indicator to said null position, an electrical power source, detector means responsive to a condition under measurement and having at least a first electrical switch arranged to be closed when the measured condition is within a predetermined normal range and a second switch arranged to be closed when the measured condition is of a minimum or zero value and a third switch arranged to be closed when the measured condition is within critical limits, an intermittent switch opening and closing electrical contacts periodically when electrically excited, means coupling one of said windings with said source through said first switch, means coupling the other of said windings with said source through said second switch, and means coupling at least one of said windings with said source through said intermittent switch contacts and through said third switch and coupling said intermittent switch for excitation by said source through said third switch, whereby said indicator is oscillated angularly when said measured condition is within said critical limits.

2. A condition indicator arrangement as set forth in claim 1 wherein said intermittent switch further comprises a bimetal armature, and an electrical heating coil for said armature adapted to be electrically excited, and wherein said intermittent switch contacts couple said one of said windings with said source through said third switch when said bimetal armature is relatively cool and couple the other of said windings with said source through said third switch when said bimetal armature is heated by said coil.

3. A condition indicator arrangement comprising a pair of electrical windings, an armature mounted for angular movement upon magnetic interaction with magnetic fields produced by said windings, an indicator coupled with said armature for limited angular movement therewith in one angular direction from a null position when one of said windings is energized and in the opposite angular direction when the other of said windings is energized, means biasing said indicator to said null position, a surface on said indicator having various markings thereon corresponding to conditions of excitation and lack of excitation of said windings; a casing enclosing said windings, armature, and indicator; a window in said casing through which selected markings on said surface are visible when each of said windings is energized and when neither of said windings is energized; an electrical power source, detector means responsive to a condition under measurement and having at least a first electrical switch arranged to be closed when the measured condition is within a predetermined normal range and a second electrical switch arranged to be closed when the measured condition is of a minimum or zero value and a third switch arranged to be closed when the measured condition is within critical limits, an intermittent switch opening and closing electrical contacts periodically when electrically excited, means coupling one of said windings with said source through said first switch, means coupling the other of said windings with said source through said second switch, means coupling at least one of said windings with said source through said intermittent switch contacts and through said third switch, and means coupling said intermittent switch for excitation by said source through said third switch, whereby said indicator is oscillated angularly exposing alternate markings on said surface to view through said window when said measured condition is within said critical limits.

References Cited in the file of this patent

UNITED STATES PATENTS

| | | |
|---|---|---|
| 1,189,183 | Thompson | June 27, 1916 |
| 2,405,429 | Jewell | Aug. 6, 1946 |

FOREIGN PATENTS

| | | |
|---|---|---|
| 850,777 | France | Sept. 18, 1939 |